United States Patent
Hölzel et al.

(10) Patent No.: US 7,112,754 B2
(45) Date of Patent: Sep. 26, 2006

(54) DEVICE FOR ACTIVATING ELECTRIC FUNCTIONAL GROUPS, IN PARTICULAR HORNS ON STEERING WHEELS OF MOTOR VEHICLES

(75) Inventors: Thomas Hölzel, Schaafheim (DE); Markus Heeg, Goldbach (DE); Frank Sauer, Niedemberg (DE)

(73) Assignee: Takata-Petri AG, (DE)

( * ) Notice: Subject to any disclaimer, the term of this patent is extended or adjusted under 35 U.S.C. 154(b) by 0 days.

(21) Appl. No.: 11/155,293

(22) Filed: Jun. 17, 2005

(65) Prior Publication Data

US 2005/0269194 A1 Dec. 8, 2005

Related U.S. Application Data

(63) Continuation of application No. PCT/DE2003/03998, filed on Dec. 2, 2003.

(30) Foreign Application Priority Data

Dec. 18, 2002 (DE) .......................... 202 19 729 U

(51) Int. Cl.
*H01H 1/18* (2006.01)
(52) U.S. Cl. .................... 200/242; 200/241; 200/61.54
(58) Field of Classification Search .. 200/61.54–61.57, 200/237–242, 252, 253, 258, 728, 731
See application file for complete search history.

(56) References Cited

U.S. PATENT DOCUMENTS

| 2,671,840 | A |   | 3/1954  | Sway                        |
|-----------|---|---|---------|-----------------------------|
| 5,327,796 | A | * | 7/1994  | Ernst et al. ....... 74/484 H |
| 5,331,124 | A | * | 7/1994  | Danielson ......... 200/61.54 |
| 5,338,906 | A | * | 8/1994  | Yokota ............. 200/61.54 |
| 5,459,294 | A |   | 10/1995 | Danielson                   |
| 5,593,178 | A | * | 1/1997  | Shiga et al. ...... 200/61.55 |
| 6,457,379 | B1| * | 10/2002 | Mirone ............. 200/61.54 |
| 6,803,533 | B1| * | 10/2004 | Bonn et al. ....... 200/61.55 |

FOREIGN PATENT DOCUMENTS

| CH | 204 988 A    |   | 5/1939  |
|----|--------------|---|---------|
| DE | 758 108 C    |   | 2/1954  |
| DE | 19852243     |   | 11/1998 |
| EP | 0 390 029    |   | 10/1990 |
| EP | 1 099 604 A2 |   | 5/2001  |
| JP | 3-284470     |   | 12/1991 |
| JP | 05178215 A   | * | 7/1993  |
| JP | 08150940 A   | * | 6/1996  |
| JP | 9-254791     |   | 9/1997  |

(Continued)

OTHER PUBLICATIONS

PCT International Preliminary Examination Report dated Mar. 6, 2004 for International Application No. PCT/DE2003/003998 (4 pages).

*Primary Examiner*—Elvin Enad
*Assistant Examiner*—M. Fishman
(74) *Attorney, Agent, or Firm*—Fitch, Even, Tabin & Flannery

(57) ABSTRACT

A device for actuating electric functional groups, in particular horns on the steering wheels of motor vehicles is disclosed. The device includes at least two opposing contacts which can be brought into contact with one another to actuate the functional group and which clean themselves by sliding against one another during contact. The opposing contacts are fixed to a respective support element with both of the elements being elastically deformable.

19 Claims, 5 Drawing Sheets

FOREIGN PATENT DOCUMENTS

| | | | | | |
|---|---|---|---|---|---|
| JP | 2002166813 | 6/2002 | WO | WO 01/66383 A1 | 9/2001 |

* cited by examiner

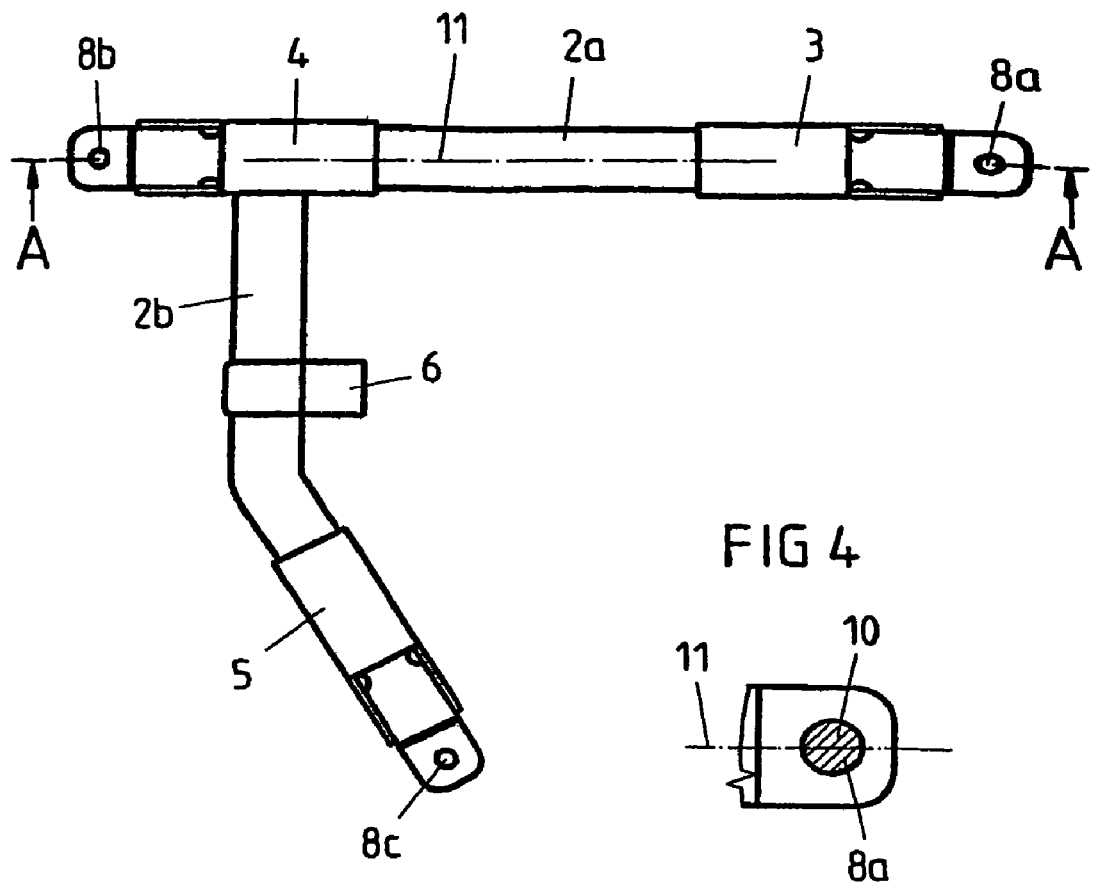
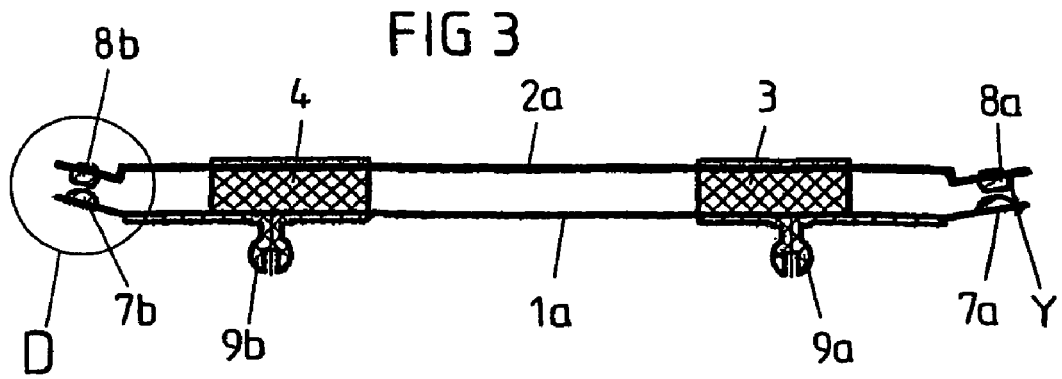

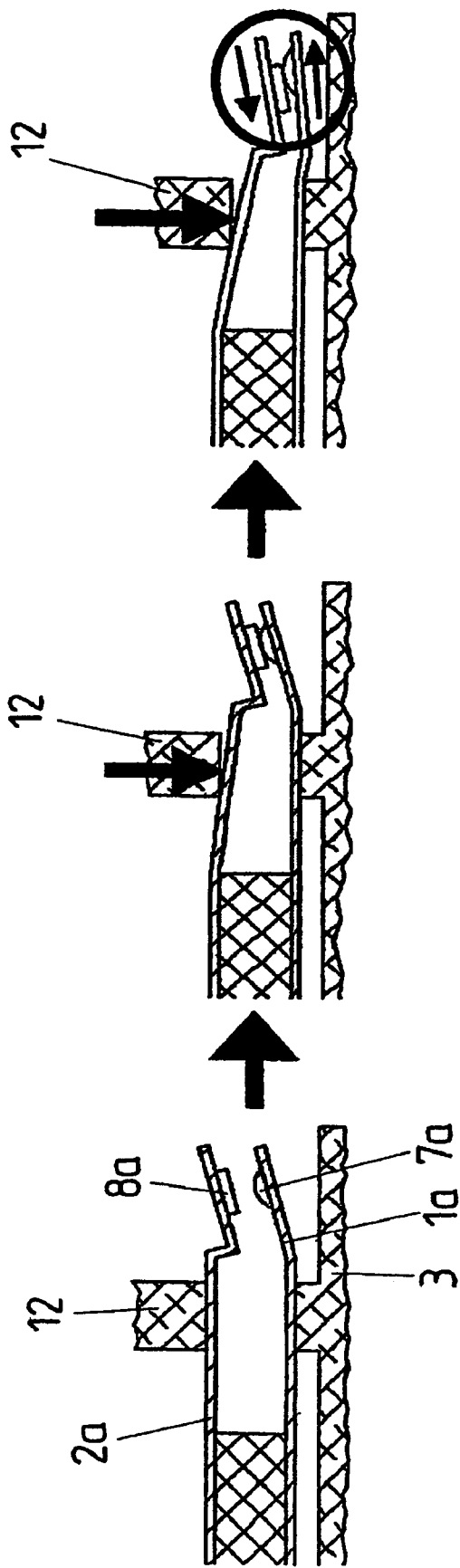

DEVICE FOR ACTIVATING ELECTRIC FUNCTIONAL GROUPS, IN PARTICULAR HORNS ON STEERING WHEELS OF MOTOR VEHICLES

CROSS REFERENCE TO RELATED APPLICATIONS

This is a continuation application of prior application number PCT/DE2003/003998, filed Dec. 2, 2003 and claims the benefit under 35 U.S.C. §119 of prior foreign application number DE 202 19 729.8, filed Dec. 18, 2002.

FIELD OF THE INVENTION

The invention relates to a device for activating electric functional groups, in particular horns on steering wheels of motor vehicles.

BACKGROUND OF THE INVENTION

WO 01/66383 A1 discloses a steering wheel for motor vehicles having a device for activating an electric functional group of a motor vehicle, in which a contact element is mounted on an assembly of the skeleton of the steering wheel and the other contact element, lying opposite, is mounted on an assembly which can move with respect to the skeleton of the steering wheel. The contact element which is mounted on the movable assembly is spring-mounted and can therefore slide along the other contact element when it is depressed. Owing to the friction which is caused in this way, soiling is cleaned from the contact elements and/or a layer of oxide is removed from them.

The disadvantage of this device is that, as in other devices according to the prior art, the contact elements are divided in two since they are attached to the abovementioned different assemblies. For this reason, both assemblies must be matched to one another in an optimum way in order to bring about satisfactory functioning.

A further disadvantage is that, in order to bring about the sliding movement of the movable contact, said contact must be mounted in a complex way since, for example, a supporting device for the movable contact is necessary.

SUMMARY OF THE INVENTION

The invention is based on the object of bringing about satisfactory functioning with relatively low expenditure with a device for activating electric functional groups with a contact device which cleans itself.

This is achieved according to the invention in accordance with the features described herein.

In a device for activating electric functional groups, in particular horns on steering wheels of motor vehicles, having at least two contacts which are opposite one another and which can be moved into contact with one another in order to activate the functional group and which slide against one another during contact in order to clean themselves, according to the invention the contacts lying opposite one another are each attached to a carrier element, which carrier elements can both be deformed elastically. The advantage of this arrangement is that, owing to the elastic deformability of the two carrier elements, they can easily be shaped. Furthermore, owing to the elastic deformability of the two carrier elements, even more reliable self-cleaning is brought about.

The invention also provides for the device for activating electric functional groups to be embodied as a separate assembly which can be attached to the location of use. As a result, contacts and corresponding contacts are no longer arranged in different assemblies, as was previously the case, but instead they are a component of one assembly which forms an enclosed system. This assembly can thus be fabricated separately, as a result of which the necessary manufacturing precision can be achieved at lower expenditure than with an arrangement in which contacts and corresponding contacts are assigned to different assemblies. The assembly according to the invention can easily be attached to the steering wheel or to the airbag module, for example by latching.

Pieces of sheet metal are preferably provided as carrier elements. Said pieces can easily be manufactured. It is expedient to use two sheet-metal parts which are connected to an insulating material by means of a plurality of encapsulations by injection molding, the two sheet-metal parts being arranged at a distance from one another. It is also expedient to provide the latching elements also on the encapsulations by injection molding. Furthermore, a plug housing should also be embodied as an encapsulation of the sheet-metal parts by injection molding in order to bring about the electrical connection to the contacts.

The contacts of the device which lie opposite one another are preferably provided on at least one end of the carrier elements. At this location, the carrier elements can easily be deformed and as a result only a slight pressure is necessary to activate the electric functional group, for example the horn. For this purpose, the encapsulations by injection molding which are composed of insulating material are arranged on at least one end section of the carrier elements in such a way that the ends of the carrier elements on which the contacts are arranged lie exposed.

This is also advantageous if the encapsulations by injection molding extend further in the direction of the ends of the carrier elements on the side which, in the installed position, lies at the bottom, underneath the lower carrier element, than on the opposite side. As a result, the lower carrier element can deform elastically only in the region of the contacts which are attached to its ends, with the result that the amount of space required underneath the lower carrier element for its elastic deformation is reduced.

In order to achieve this objective, the carrier elements can also be bent upward at their ends by 20° at maximum, and preferably 15°.

For the arrangement of the device in a steering wheel it is expedient for each carrier element to have two component elements which extend at an angle to one another, one end of a second component element being connected to the first component element in the encapsulation of said first component element by injection molding. In this embodiment, pairs of contacts are provided at the ends of the first component elements and at the free end of the second component elements, the pairs of contacts lying at the corners of an imaginary triangle.

In order to bring about good self-cleaning of the contacts, in one preferred embodiment in each case one contact has a spherical contact face, while the contact lying respectively opposite has a contact face with a planar macrostructure. Furthermore, the contact with the planar macrostructure should have a finely structured surface by providing grooves, for example. The contact in which the grooves are provided can be arranged in such a way that these grooves extend transversely with respect to the direction in which the contacts slide against one another. This contact can, however, also be arranged in such a way that the grooves extend at an angle of greater than 0° and less than 90°, preferably at an angle of 45°, with respect to the direction in which the contacts slide against one another.

The contact faces are preferably composed of finely grained silver.

It is also expedient that the contact with the planar macrostructure is arranged over the contact with the spherical contact face.

BRIEF DESCRIPTION OF THE DRAWINGS

The invention will be explained in an exemplary embodiment with reference to the drawings, in which:

FIG. 2 is a plan view of the device according to FIG. 1;

FIG. 3 is a section A—A according to FIG. 2 through the device;

FIG. 4 is a view Y according to FIG. 3,

FIGS. 9A–C show the method of operation of the device.

DETAILED DESCRIPTION OF THE PREFERRED EMBODIMENTS

Figure 1:
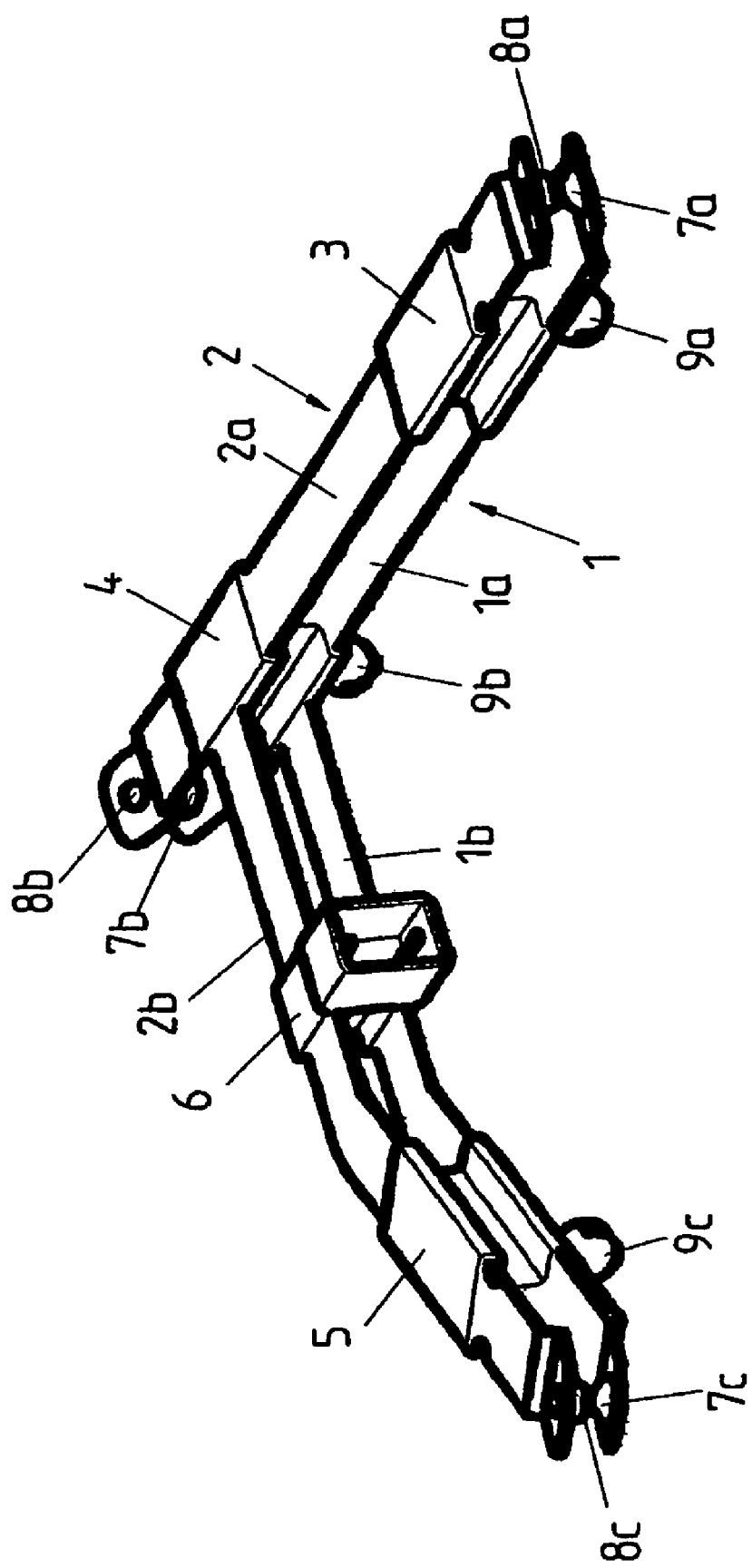
FIG. 1 is a perspective view of the device according to the invention.

From the perspective view of an embodiment of the device according to the invention for a steering wheel it is apparent that this device constitutes a separate assembly which can be completely prefabricated and easily mounted, in contrast to previous devices for activating electric functional elements, in particular horns, whose parts are arranged on different assemblies of the steering wheel. The device has two carrier elements 1, 2 which are held at a predetermined distance apart by encapsulations 3, 4, 5 by plastic injection molding. The carrier element 1 has two component elements 1*a* and 1*b* which extend at an angle to one another and the carrier element 2 has component elements 2*a* and 2*b* extending in the same direction as the component elements 1*a* and 1*b*. The carrier elements are composed of electrically conductive, elastically deformable sheet-metal parts and can be fabricated in one piece or composed of two parts which are electrically conductively connected to one another. The connecting location lies within the encapsulation 4 by injection molding. A plug 6 is also embodied as an encapsulation by injection molding.

The component element 1*a* of the carrier element 1 has contacts 7*a, b* at its ends, and the component element 1*b* has a contact 7*c* at its free end. At the ends of the component element 2*a*, contacts 8*a, b* are provided which lie opposite the contacts 7*a, b* and provide on the component element 2*b* is a contact 8*c* which lies opposite the contact 7*c*. The carrier element 1 also has three latching elements 9*a, b, c*.

From the plan view in FIG. 2 it is apparent that the component element 2*b* does not extend linearly but instead is bent so that in the plan view the contacts lie approximately at the corners of a triangle which is matched to the shape of a steering wheel.

As is apparent from FIG. 3, the encapsulations 3, 4 by injection molding extend further in the direction of the ends of the component elements 1*a* on the underside on which the latching elements 9*a, 9b* are provided than on the opposite side of the component element 2*a*. The same also applies to the encapsulation 5 by injection molding which extends further towards the end on the component element 1*b* than on the component element 2*b*. This ensures that the component elements 1*a*, 1*b* cannot deform in this region in which pressure is exerted on the carrier element 2 when the functional elements are activated.

Figure 5:
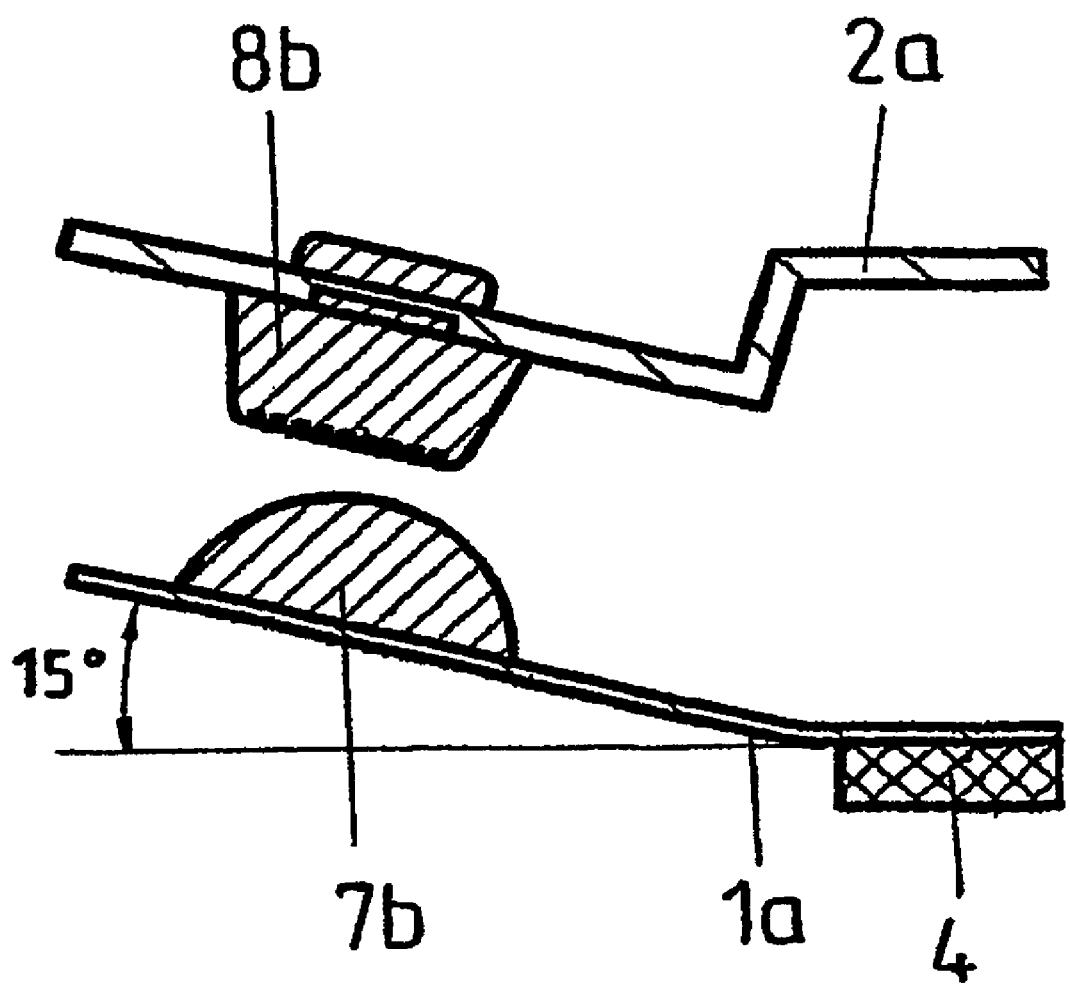
FIG. 5 is an enlarged illustration of the detail D in FIG. 3.
Figure 6:
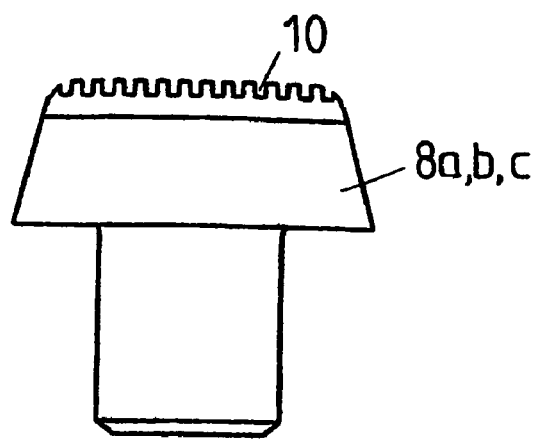
FIG. 6 shows the side view of the contact with a planar macrostructure.
Figure 7:
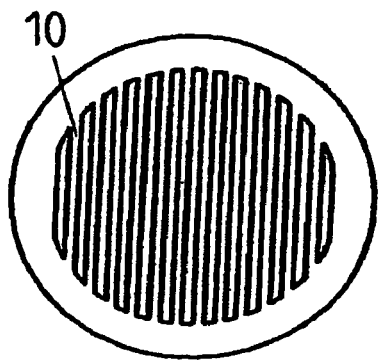
FIG. 7 is a plan view of the contact according to FIG. 6.
Figure 8:
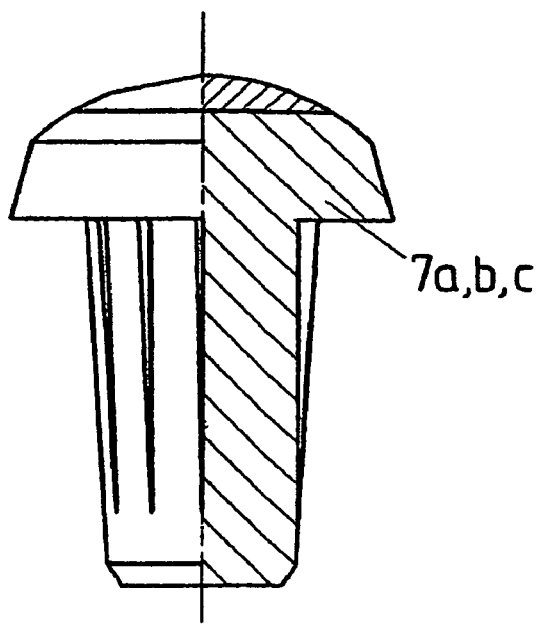
FIG. 8 is a side view, partially in section, of the contact with a curved surface.

In FIG. 5, the free ends of the component elements 1*a*, 2*a*, which are located on the left in FIG. 3, are illustrated in enlarged form. The contact 7*b* which is provided on the exposed end of the carrier element 1*a* has a spherical or approximately spherical contact face that is apparent also from FIG. 8. The contact is embodied in FIG. 8 as a rivet which is connected to the component elements 1*a*, 1*b*. The contact 8*b* which is provided on the exposed end of the component element 2*a* has a contact face with a planar macrostructure, as is also apparent from FIG. 6. Grooves 10 are formed in this planar structure. After attachment to the component element 2*a*, said grooves extend at an angle of 45° with respect to the displacement direction of the contacts explained later in this embodiment. The displacement direction corresponds essentially to the longitudinal axis 11 of the component elements 1*a*, 1*b* (FIGS. 2, 4). The contact 8*b* is also embodied as a rivet, as is apparent from FIG. 6.

The arrangement of the contacts 7*b*, 8*b* which is illustrated in FIG. 5 also applies to the other contacts. This also applies to the profile of the exposed ends of the carrier elements 1, 2 which can be seen in particular in FIGS. 2 and 5. From these figures it is apparent that these ends are bent toward the side with the latching elements i.e. upward. In the present embodiment, they are bent by 15°. As a result, a sufficient free space for the deformation of the exposed ends of the carrier elements 1, 2 is available.

The method of operation of the device is illustrated in FIGS. 9*a* to 9*c*. FIG. 9*a* shows the position of rest of the contacts, in which an activation element 12 lies loosely on the component element 2*a*. By depressing the activating element, as is illustrated in FIG. 9*b*, the contacts 7*a*, 8*a* are pressed one on to the other. In the process, at first only the exposed end of the component element 2*a* is elastically deformed. By further depressing the activation element 12, as is illustrated in FIG. 9*c*, the component element 1*a* is also elastically deformed. In the process, the contacts 7*a*, 8*a* move toward one another, as has been made clear in FIG. 9*c* by the arrows surrounded by a circle.

During this movement the contact faces rub against one another and clean one another in the process.

The method of operation which is explained here for one pair of contacts also applies to the other pairs of contacts 7*b*, 8*b* and 7*c*, 8*c*.

By using the elastic deformation of both contact carriers for the first time, the movement which is necessary for the self-cleaning of the contacts is brought about with less expenditure than in the past.

What is claimed is:

1. A device for activating electric functional groups on steering wheels of motor vehicles, having at least two contacts which are opposite one another and which can be moved into contact with one another in order to activate the functional group and which slide against one another during contact in order to clean themselves, the contacts lying opposite one another being each attached to a carrier element, which carrier elements can both be deformed elastically so that both contacts are elastically moved and slide against each other in generally opposite directions to one another, and the device being embodied as a separate assembly which can be attached to the location of use, characterized in that the device has two sheet-metal parts as carrier elements which are connected by means of a plurality of encapsulations of insulative material, the two sheet-metal parts being arranged at a distance from one another, and in that the insulative encapsulations have latching elements.

2. The device as claimed in claim 1, characterized in that a plug housing is embodied as an encapsulation of the sheet-metal parts by injection molding.

3. The device as claimed in claim 1, characterized in that the contacts which lie opposite one another are provided on at least one end of the carrier elements.

4. The device as claimed in claim 1, characterized in that the encapsulations by injection molding which are composed of insulating material are arranged on at least one end section of the carrier elements in such a way that the ends of the carrier elements on which the contacts are arranged lie exposed.

5. The device as claimed in claim 1, characterized in that the encapsulations by injection molding extend further in the direction of the ends of the carrier elements on the side which, in the installed position, lies at the bottom, underneath the lower carrier element, than on the opposite side.

6. The device as claimed in claim 1, characterized in that the carrier elements are bent upward at their ends.

7. The device as claimed in claim 6, characterized in that the carrier elements are bent by 20° at maximum.

8. The device as claimed in claim 6, characterized in that the carrier elements are bent by 15°.

9. The device as claimed in claim 1, characterized in that each carrier element has two component elements which extend at an angle to one another, one end of a second component element being connected to the first component element in the encapsulation of said first component element by injection molding.

10. The device as claimed in claim 9, characterized in that pairs of contacts are provided at the ends of the first component elements and at the free end of the second component elements, the pairs of contacts lying at the corners of an imaginary triangle.

11. The device as claimed in claim 1, characterized in that the device is attached to a steering wheel or to an airbag module.

12. The device as claimed in claim 1, characterized in that in each case one contact has a spherical contact face, and in that the contact lying respectively opposite has a contact face with a planar macrostructure.

13. The device as claimed in claim 12, characterized in that the contact with the planar macrostructure has a finely structured surface.

14. The device as claimed in claim 12, characterized in that grooves are provided in the contact face with the planar macrostructure.

15. The device as claimed in claim 14, characterized in that the contact with the grooves is arranged in such a way that these grooves extend transversely with respect to the direction in which the contacts slide against one another.

16. The device as claimed in claim 14, characterized in that the contact with the grooves is arranged in such a way that these grooves extend at an angle of greater than 0° and less than 90° with respect to the direction in which the contacts slide against one another.

17. The device as claimed in claim 16, characterized in that the grooves extend at an angle of 45° with respect to the direction in which the contacts slide against one another.

18. The device as claimed in claim 12, characterized in that the contact faces are composed of finely grained silver.

19. The device as claimed in claim 12, characterized in that the contact with the planar macrostructure is arranged over the contact with the spherical contact face.

* * * * *